No. 788,714. PATENTED MAY 2, 1905.
C. E. FLEMMING.
BRISTLE FASTENER FOR BRUSHES.
APPLICATION FILED MAR. 28, 1904.
2 SHEETS—SHEET 1.
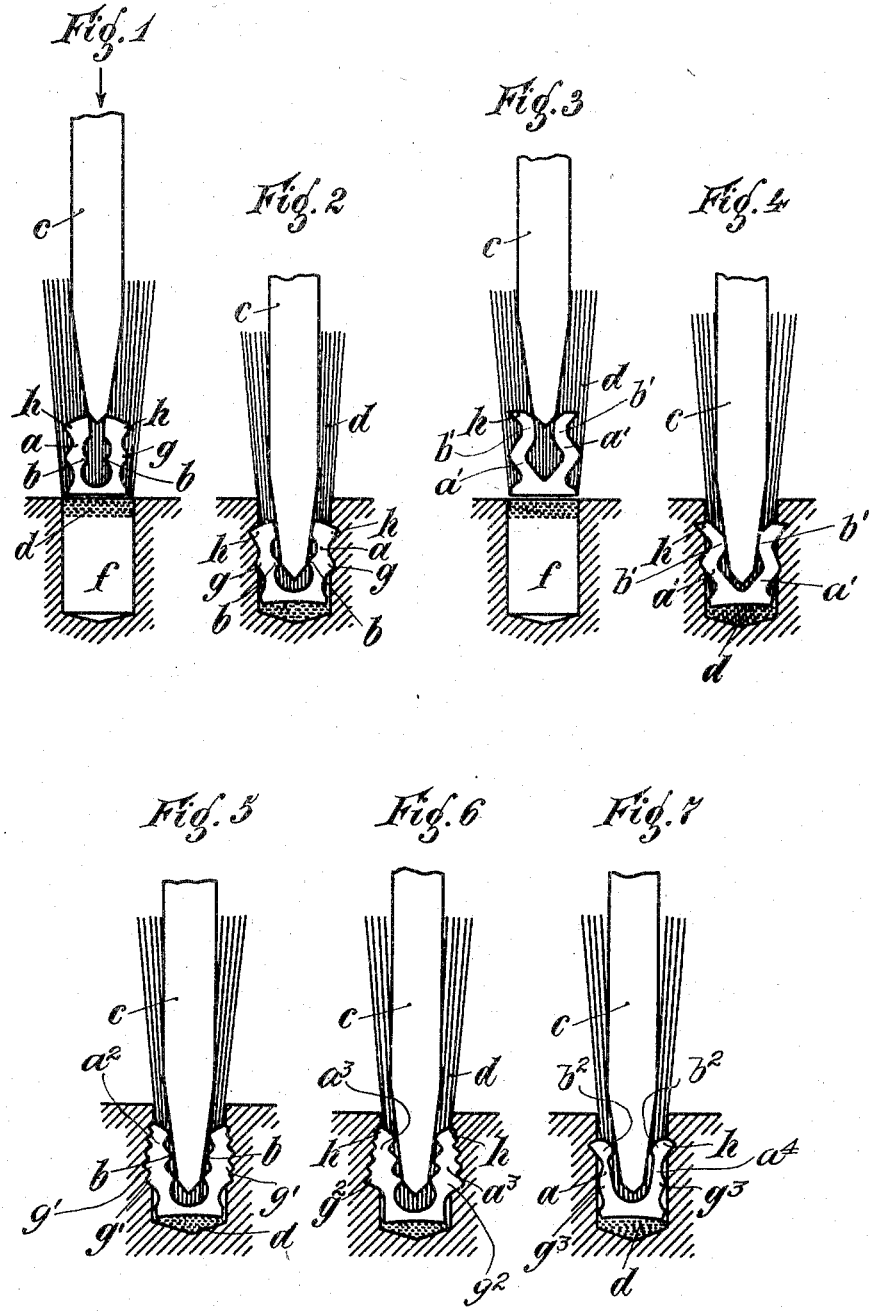
Witnesses:
Nellie Yates
R. W. Bishop
Inventor:
Carl Edward Flemming,
By David Davis,
Associate Attorneys.

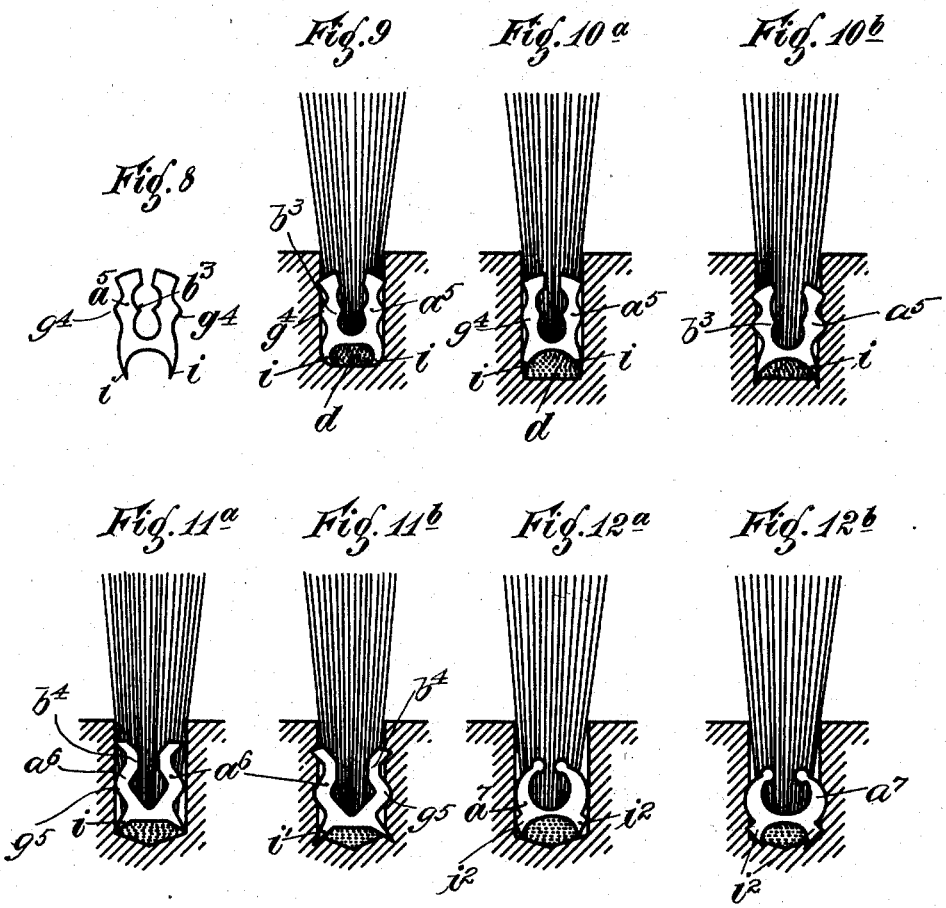

No. 788,714. Patented May 2, 1905.

UNITED STATES PATENT OFFICE.

CARL EDUARD FLEMMING, OF SCHÖNHEIDE, GERMANY.

BRISTLE-FASTENER FOR BRUSHES.

SPECIFICATION forming part of Letters Patent No. 788,714, dated May 2, 1905.

Application filed March 28, 1904. Serial No. 200,363.

*To all whom it may concern:*

Be it known that I, CARL EDUARD FLEMMING, a subject of the King of Saxony, residing at Schönheide, in the Kingdom of Saxony, German Empire, have invented certain new and useful Improvements in Bristle-Fasteners for Brushes and the Like, of which the following is a specification.

This invention has for its object a novel form of fastener or clip of U or V shape for fixing the bundles or bristles in the backs or bodies of brushes.

The clips are, according to this invention, provided with projections or teeth upon the inner side of their arms also, the fixing-tool being of a shape adapted to act upon these projections in such a manner that according as it may be necessary or desirable the upper teeth only or the lower teeth only or all the teeth may be forced into or at least pressed firmly against the walls of the hole in which the clip is inserted. The inner teeth or projections may be arranged relatively to the outer projections on the arms of the clips in any desired manner, either symmetrically or otherwise with respect to these outer teeth or to each other. The inner projections may therefore be situated exactly opposite to the outer in such a manner that direct pressure is transmitted from the inner to the outer projections, or the inner projections may lie between each pair of outer projections, so that pressure is transmitted from one inner projection to two outer. If the arms of the clips are made sufficiently narrow, and therefore present a certain amount of spring, or if they consist of resilient material, an efficient fixing in the brush-holes will be effected. The tools employed for inserting and pressing in clips of this kind (mandrel, punch, pin, or the like) are provided with a long point which is driven between the inner projections of the arms of the clip. The projections and the wedge or conically-formed sides of the tool which coöperate therewith may be arranged in such a manner that by driving in the tool between the arms of the clip either the teeth on the ends of the arms are first of all driven into the wall of the hole and then those situated lower down, or so that the forcing in of all these teeth takes place simultaneously when the wedge or conical sides of the tool bear against all the projections and it is then again drived forward. In accordance with the selection of the wedge or conical shape of the point of the tool as compared with the position of the projections the lower or middle teeth of the arms of the clip or one or other of them may be driven first or more or less deeply into the wall of the hole, so that this clip may be fixed in any desired manner into its hole in the body of the brush by suitable shaping or by proportioning the point of the fixing-tool.

It may happen that the teeth of one arm of the fastener will enter the body of the brush more deeply than those of the other, more especially when the axis of the fixing-tool does not coincide exactly with that of the hole. In this case the bristles of the bundle on the arm, the teeth of which have not entered far enough in the body of the brush, will become loose and leave the fastener by way of the interval between it and the wall of its hole, whereupon they may readily be pulled out, when the whole bundle loses its hold. In order to obviate this defect—that is to say, to prevent the bristles from coming out by way of the interval between the fastener and the wall of the hole in the brush-body, and thereby insure a far more certain fixing of the bristles—the fasteners are provided on their under face with projections directed oppositely to the arms—that is to say, downwardly directed. These confine the bundle laterally and so hold all the bristles together. When the fastener is forced into its hole, the projections, according to the material of which the brush-body is composed, either enter the bottom of the hole or arrange themselves upon it.

In the accompanying drawings, Figure 1 is an enlarged view showing the position and shape of the improved fastener before being secured in the brush-block, and Fig. 2 is the same view of the fastener after being secured in the block. Figs. 3 and 4 show a modified construction of the fastener in the positions corresponding to the positions shown in Figs. 1 and 2. Fig. 5 is a second, Fig. 6 a third, and Fig. 7 a fourth, modification of the fastener. Fig. 8 is an enlarged view of a fastener provided with projections directed oppositely to the arms, and Fig. 9 shows the same fastener after being secured in the brush-block. Figs. $10^a$ and $10^b$ represent a modification of the fastener shown in Fig. 8, and Figs. $11^a$, $11^b$ and Figs. $12^a$, $12^b$ show two other modifications of the latter.

According to my invention a clip $a$, Figs. 1 and 2, is provided with a pair of inner projections $b$. A fixing-tool $c$, which may be driven forward in any convenient manner, forces with its blunted point the clip, together with the bundle $d$ of bristles which it contains, into the hole $f$ in the back or body of the brush. In the further forward movement of the tool $c$ its point and the wedge or conically shaped sides penetrate between the arms of the clip $a$, bends them outwardly, and by the intermediary of the inner projections $b$ presses the outer lower teeth $g$ into the wall of the hole. At the same time or somewhat later the wedge or conical shaped sides of the tool $c$ also drive the upper outer teeth $h$ into the wall.

In a modified construction of clip shown in Figs. 3 and 4 two teeth are driven into the wall of the hole by means of a pair of inner projections $b$ in a similar manner.

In other modifications a clip-fastening $a^2$ is used in which the middle teeth $g'$, Fig. 5, are driven most deeply into the walls of the hole, or a form of fastening $a^3$, in which the lowest teeth $g^2$, Fig. 6, are so driven in. Another form is shown at $a^4$ in Fig. 7, in which, by means of the inner projections $b^2$, located at the ends of the arms of the clip, only two upper teeth are forced into the wall of the hole, while the lower teeth $g^3$ are only pressed against it.

In the modification shown in Fig. 8 the clip or fastener $a^5$ is provided at its lower corners with downward-extending projections $i$, between which the bristles are laid and which prevents any possibility of the bristles coming out laterally. If a fastener of this kind is inserted in a brush-body of hard material, said projections $i$ will bear against the bottom of the hole in the brush-body, as in Fig. 9, firmly compressing the bristles between them, so that not one of them remains loose. When the brush-body is of soft material, the projections $i$, as shown in Figs. $10^a$ and $10^b$, are not bent over in any way, but enter the material at the bottom of the hole, so that in this instance also the bristles are strongly compressed.

The form of clip shown in Figs. 8, 9, $10^a$, and $10^b$ is provided with the projections $b^3$ on the inner sides of its vertical arms and with the projections $q^4$ on the outer sides thereof, these projections operating in the same manner as the corresponding projections on the clips shown in Figs. 1 and 2. The bristle-retaining projections may also be arranged in the manner shown at $i'$ in Figs. $11^a$ and $11^b$ and at $i^2$ in Figs. $12^a$ and $12^b$.

The form of fastener $a^6$ shown in Figs. $11^a$ and $11^b$ is provided on the inner sides of its arms with the projections $b^4$ and on the outer sides of its arms with the projections $g^5$.

The fastener $a^7$ (shown in Figs. $12^a$ and $12^b$) is so constructed that the inserting-tool will contact with the upper ends of the arms thereof and force said arms outward against the wall of the bristle-containing hole, the downward-extending projections being dispensed with.

The novel clip or fastener may also be employed for other purposes.

Having now described my invention, what I desire to secure by a patent of United States is—

1. A bristle-fastener of substantially U shape and formed with outward-extending teeth or projections on the outer sides of the vertical arms, and a plurality of contact-points on the inner sides of each of its arms, the contact-points on the inner side of each arm being separated from each other.

2. A bristle-fastener of substantially U shape and formed with outward-extending teeth on the outer edges of each of its vertical arms, a plurality of contact-points on the inner side of each of said arms and adapted to be engaged by the inserting-tool, the contact-points on each arm being separated from each other, and downward and outward extending bristle-inclosing points formed at each of the lower corners of the fastener.

3. A bristle-fastener of substantially U shape and formed with a plurality of teeth on the outer side of each of its arms, a plurality of contact-points on the inner side of each of its arms and adapted to be engaged by the inserting-tool, said contact-points coinciding with the teeth on said arms.

4. A bristle-fastener of substantially U shape and formed with a plurality of teeth on the outer side of each of its arms, a plurality of contact-points on the inner side of its arms and adapted to be engaged by the inserting-tool, said contact-points coinciding with the teeth on said arms, and downward-extending bristle-retaining points formed at the lower corners of the fastener.

5. A bristle-fastener of substantially U shape and formed with outward-extending teeth or projections on the outer sides of the vertical arm and a plurality of contact-points on the inner side of each of its arms, the points on each arm being separated from each other, the lowermost teeth on the outer sides of the arms being larger than the other teeth of the arms.

In witness whereof I have hereunto set my hand in presence of two witnesses.

CARL EDUARD FLEMMING.

Witnesses:
PAUL HAGERT,
EMIL SCHMIDT.